Aug. 13, 1963     F. C. CARROLL     3,100,720
WEIGHING SCALE
Filed Oct. 4, 1961     4 Sheets-Sheet 1
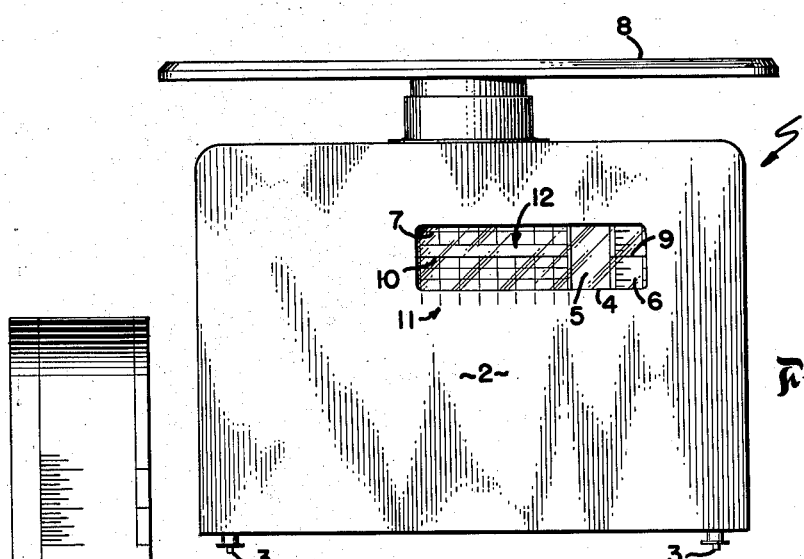
Fig. I
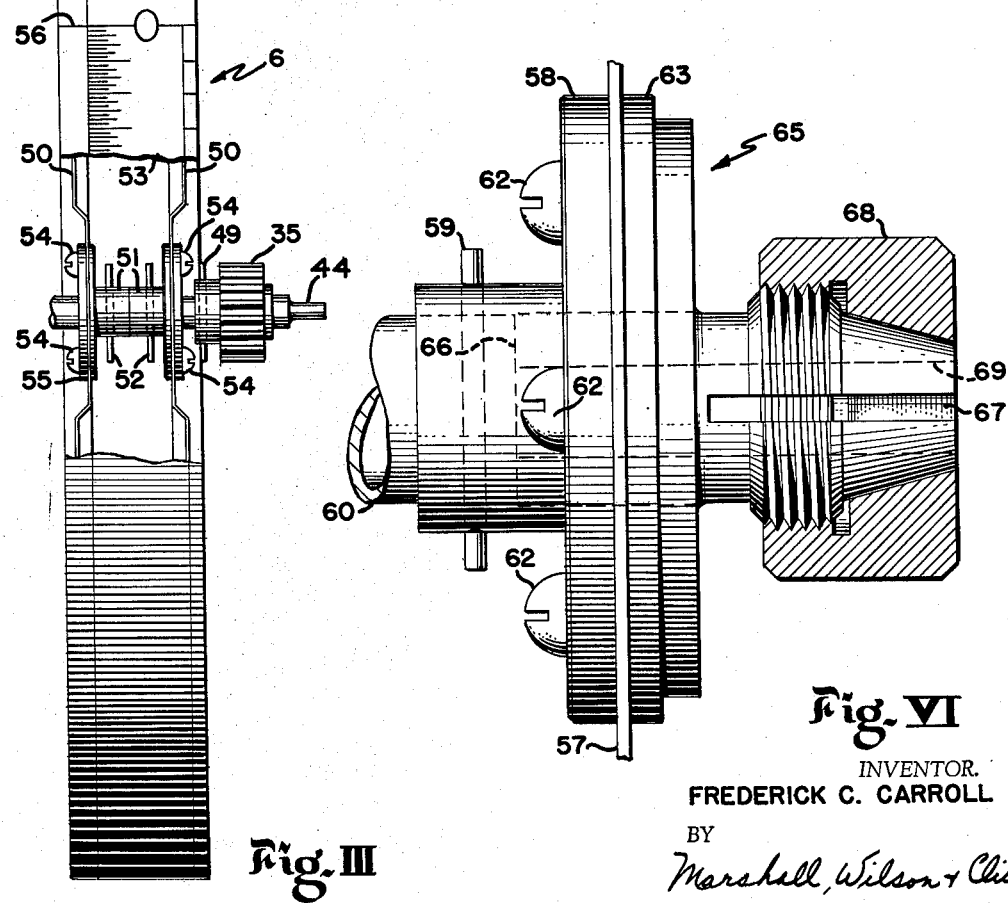
Fig. III     Fig. VI
INVENTOR.
FREDERICK C. CARROLL
BY
Marshall, Wilson + Click
ATTORNEYS Aug. 13, 1963

F. C. CARROLL 3,100,720

WEIGHING SCALE

Filed Oct. 4, 1961

4 Sheets-Sheet 2

*Fig. II*

INVENTOR.
FREDERICK C. CARROLL

BY Marshall, Wilson & Click

ATTORNEYS

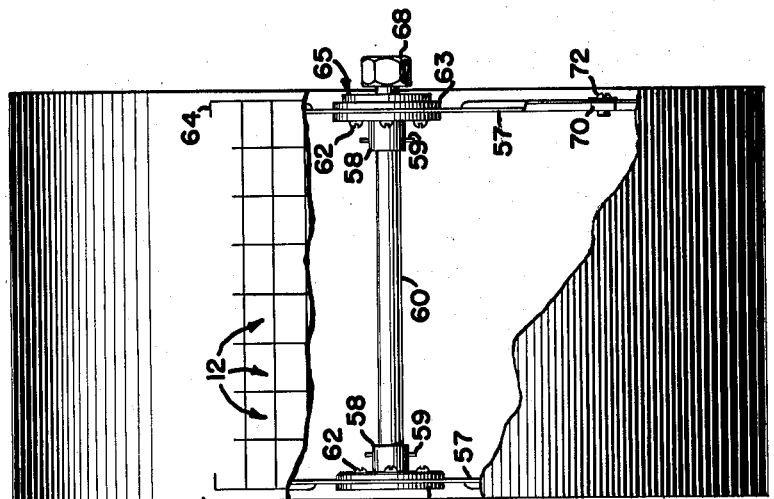
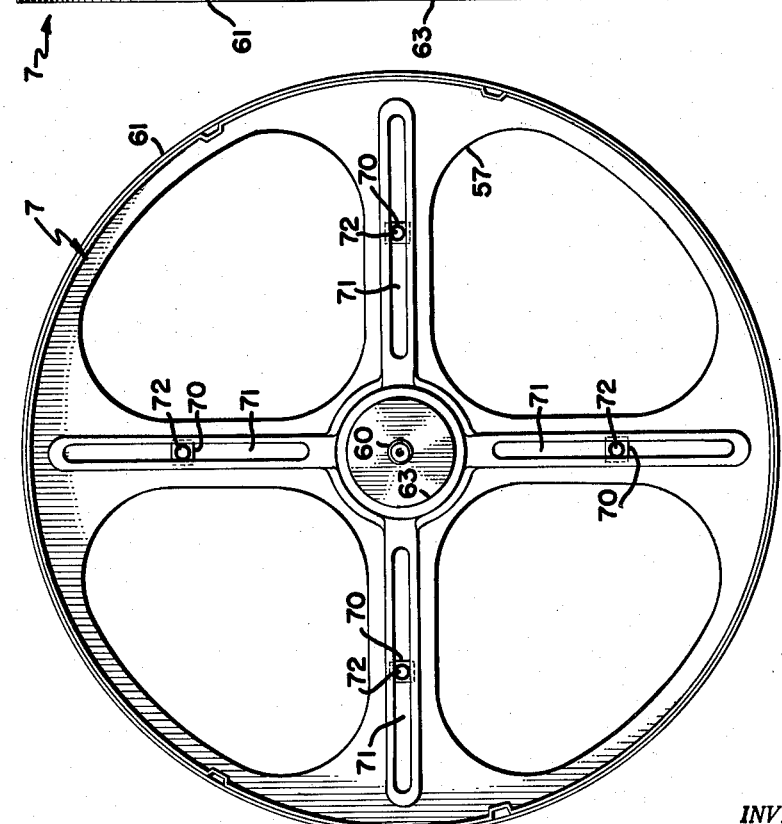
INVENTOR.
FREDERICK C. CARROLL
BY
Marshall, Wilson & Click
ATTORNEYS Aug. 13, 1963  F. C. CARROLL  3,100,720
WEIGHING SCALE
Filed Oct. 4, 1961  4 Sheets-Sheet 4
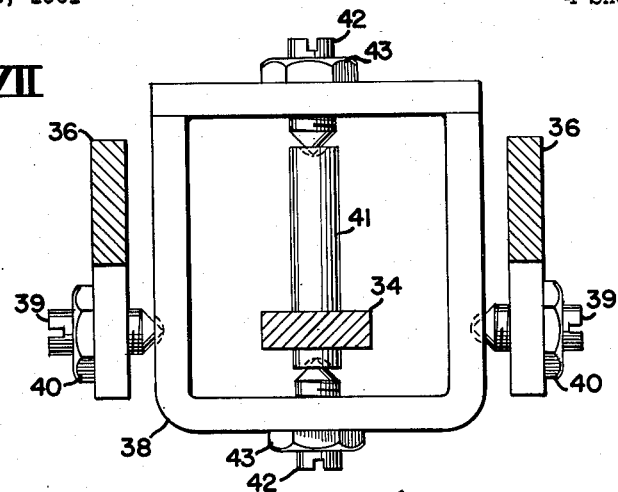
Fig. VII
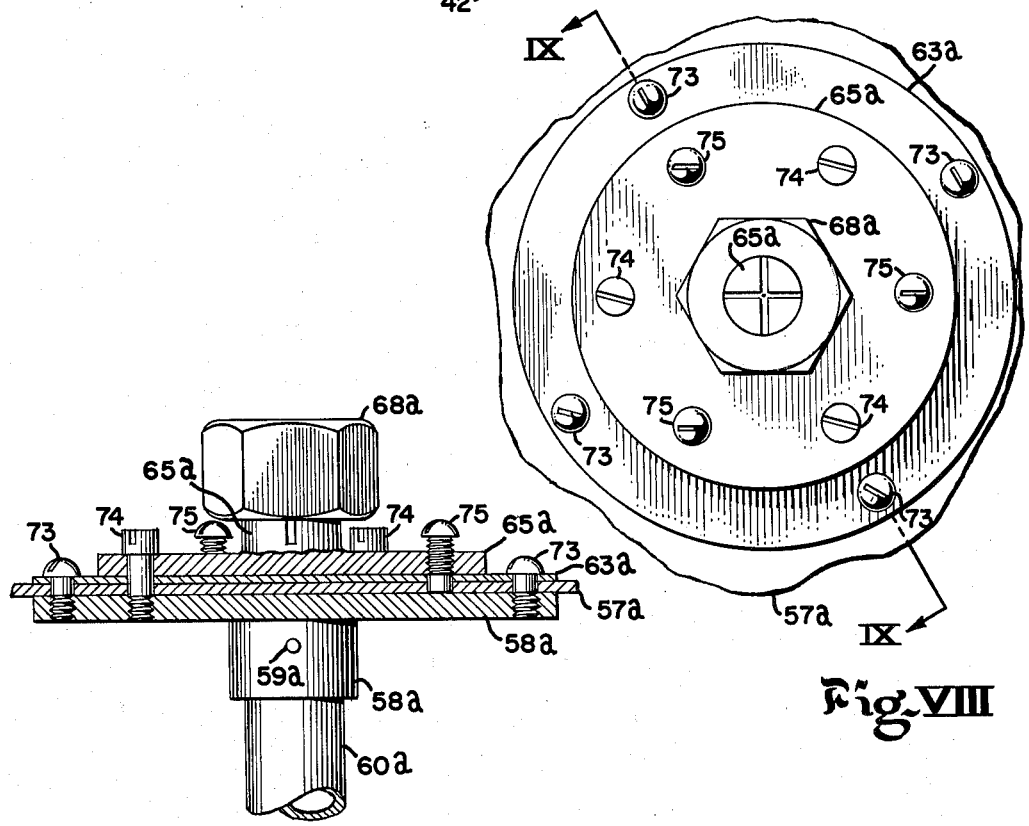
Fig. VIII
Fig. IX
INVENTOR.
FREDERICK C. CARROLL
BY
ATTORNEYS United States Patent Office
3,100,720
Patented Aug. 13, 1963

3,100,720
WEIGHING SCALE
Frederick C. Carroll, Toledo, Ohio, assignor to Toledo Scale Corporation, Toledo, Ohio, a corporation of Ohio
Filed Oct. 4, 1961, Ser. No. 142,844
6 Claims. (Cl. 177—37)

This invention relates to weighing scales and more particularly to weighing scales incorporating charts which can be readily replaced by others without destroying the seals of the scales.

One of the major items in the Post Office Department specifications for parcel post weighing scales is the requirement that the postal rate charts be replaceable quickly in the event of rate changes. The specifications require that a postal employee unskilled in scale mechanics shall be able to substitute one rate chart for another in a weighing scale in one hour or less and that such scale will then weigh correctly, at least after minor zero corrections.

No prior weighing scale is known having a chart which can be readily replaced by another without destroying the seal of the scale.

The objects of this invention are to improve weighing scales, to facilitate the replacement of charts in such scales, to provide for the replacements of charts in such scales without destroying the seals of such scales, to facilitate the replacement of charts in such scales and at the same time provide for retaining the seals of such scales, to simplify the construction of such scales, to facilitate the mechanical adjustment of such scales and to provide an improved parcel post cylinder scale.

One embodiment of this invention enabling the realization of these objects is a cylinder weighing scale having two charts in contrast to the usual single chart, i.e., a weight chart which remains in the scale and against which the scale is sealed and a readily replaceable rate chart, i.e., a chart for indicating postal charges in various zones, which can be replaced by a postal employee unskilled in scale mechanics because its replacement does not destroy the seal of the scale.

In accordance with the above, one feature of this invention resides in so mounting the rate chart in the scale that it can be readily replaced by another in the event of rate changes. The substituted rate chart is readily positioned in the scale so that the scale will then weigh correctly, at least after minor zero corrections. A man unskilled in scale mechanics can replace the rate chart with another in thirty minutes. The weight chart sealing adjustment is peculiar to each scale, the scale being sealed in at the factory in the usual way. Since the weight chart is never removed, the scale stays sealed in. The rate chart balance adjustment is peculiar to each rate chart, the rate charts being balanced relative to their axes of rotation at the factory and supplied to the field for replacement at random in the two-chart scales.

The above and other objects and features of this invention will be appreciated more fully from the following detailed description when read with reference to the accompanying drawings wherein:

FIG. I is an elevational view of a weighing scale showing parts of cylindrical weight and postal rate charts behind a window;

FIG. II is a fragmentary, enlarged view of the weighing scale shown in FIG. I, part of the housing being broken away to reveal interior mechanism including the cylindrical weight and postal rate charts illustrated in FIG. I;

FIG. III is a detailed view of the cylindrical weight chart shown in FIG. II, part of the surface of the chart being broken away to reveal interior structure;

FIG. IV is a detailed view of the cylindrical postal rate chart shown in FIG. II, part of the surface of the chart being broken away to reveal interior structure;

FIG. V is an elevational view of the postal rate chart as seen looking toward the left end of the chart as illustrated in FIG. IV;

FIG. VI is an enlarged view, partly in section, of the mounting means for the postal rate chart shown in FIG. IV;

FIG. VII is a horizontal sectional view taken along the line VII—VII in FIG. II;

FIG. VIII is an end elevational view of a modified mounting means for the postal rate chart corresponding to a view as seen looking toward the right end of the mounting means illustrated in FIG. VI; and FIG. IX is a horizontal sectional view taken along the line IX—IX of FIG. VIII.

Referring to the drawings, a parcel post weighing scale 1 includes a housing 2 supported on feet 3 and defining a window opening 4 closed by a magnifying lens 5 through which rotatable cylindrical weight and postal rate charts 6 and 7 are viewed. Charts 6 and 7 are rotatable about a common axis as one. Articles to be weighed are placed upon a platter 8 operatively connected to the weighing mechanism shown in FIG. II. The scale 1 functions like any ordinary parcel post cylinder scale, i.e., the weight of an article placed upon the platter 8 is indicated by a stationary reading line 9 stretched adjacent the rotatable weight chart 6 and the amount of postage needed to mail the article is indicated by a stationary reading line 10 stretched adjacent the rotatable rate chart 7. The rate chart 7, which is a computing chart that computes the dollars and cents amount of the postage needed to mail an article in accordance with the weight of the article and the mailing zone, is provided with eight columns identified by indicia 11 underneath the window opening 4 as "Local," "Zone 1 and 2," "Zone 3," "Zone 4," "Zone 5," "Zone 6," "Zone 7," and "Zone 8," each column being divided into squares 12 each containing a black and a red figure (figures not shown). The black figures are for surface mail and the red figures are for air mail. In operation, an article to be mailed is placed upon the platter 8 and one of the eight mailing zone columns 11 is selected. The weight of the article is indicated on the weight chart 6 at reading line 9 and the amount of postage needed to mail the article is indicated on the rate chart 7 in the selected zone column 11 at the reading line 10, the black or the red figure in the chart square 12 at the reading line 10 being read depending on whether the surface or air mail rate is desired. The weighing scale insofar as it has been described is like any ordinary parcel post cylinder scale except it has two charts 6 and 7 in contrast to the usual single chart having separate weight and rate sections.

The force of gravity acting on a load placed upon the platter 8 is transmitted to a lever 13 (FIG. II) fulcrumed on ball bearings in the base of the weighing scale. A lever similar to the lever 13 is shown and described in detail in U.S. Patent No. 2,895,726 entitled "Ball Bearing Scale Pivots," and issued to L. S. Williams on July 21, 1959. Also, an operative interconnection for the platter 8 and lever 13 is shown in such patent together with mechanism needed for an operable weighing scale. These load forces acting on the lever 13 are transmitted to a load counterbalancing spring 14. The upper end of the spring 14 is connected through a clamp 15 to a threaded rod 16, the threaded rod 16 extending through an oversize hole in the clamp 15 and secured therein by means of a nut 17 (only one shown) one on either side of the clamp 15. When the nuts 17 are loosened, the clamp 15 and, thus, the upper end of the spring 14 can be shifted to the right or the left as viewed in FIG. II providing a one-half capacity sealing adjustment. The clamp 15 is shown and described in detail in U.S. patent application Ser. No. 618,050, filed October 24, 1956, now Patent No. 3,009,523, in the name of L. S. Williams. The lower end of the spring 14 is connected through a clamp 18, which is like the upper clamp 15, to the end of the lever 13, the clamp 18 being connected to the lever 13 by means of a bolt 19, extending through the lever and an oversize hole in the clamp 18, and a nut 20. When the nut 20 is loosened, the clamp 18 and, thus, the lower end of the spring 14 can be shifted to the right or the left as viewed in FIG. II providing a span (zero to full) capacity sealing adjustment.

The upper end of the rod 16 is attached to a trunnion 21, having horizontally extending pins 22, only one of which is shown, which rest in V-shaped bearing surfaces of a bifurcated portion 23 of a bell crank 24, the rod 16 being rockable about the axes of the pins 22. The bell crank 24 is rockable about the axes of cone pointed screws 25 which are threaded through the flat spaced sides 26 of a pillar 27 having spaced feet 28 resting and secured to the scale base and defining an opening 29 in its face through which the bifurcated bell crank portion 23 extends, the screws 25 engaging conical depressions in the bell crank and being held against turning by lock nuts 30 which are so adjusted that the bell crank is free to rock yet is mounted with a minimum of play. The bell crank 24 is rocked by turning an adjustment screw 31 threaded through a boss 32 on the pillar 27 to move the screw toward or away from an upper arm 33 of the bell crank. Force provided by the spring 14 always urges the upper bell crank arm 33 against the end of the adjustment screw 31 and the pins 22 against the bearing surfaces of the bifurcated bell crank portion 23. Rocking of the bell crank 24 by the turning of the adjustment screw 31 lowers or lifts the spring 14 providing a zero scale adjustment.

The extension of the spring 14, which is proportional to the load on the scale, permits the spring supported end of the lever 13 to drop a distance proportional to the load and this movement is transmitted through a rack 34 and pinion 35 to rotate the cylindrical weight and rate charts 6 and 7 through equal increments of angle for equal increments of load upon the scale. The rack 34 is kept in engagement with the pinion 35 by means of a guide roller (not shown) and the lower end of the rack is operatively connected for rocking about two axes to the lever 13 by means of the mechanism shown in FIGS. II and VII. The lower end of the rack 34 is pivotable about two axes that are perpendicular to each other. This compensates for arcuate and lateral movements of the lever so that the rack and the pinion do not bind. The pivotable connection for the rack 34 includes a yoke 36 rigidly attached to an integral extension 37 of the lever 13 and a rectangular frame 38 pivotally connected to the yoke by means of cone-pointed screws 39 provided with lock nuts 40 for holding them in adjusted positions. The axes of the screws 39 are parallel to the fulcrum axis of the lever 13. The rack 34 is provided with an extension 41 which is pivotally connected to the frame 38 by means of cone-pointed screws 42 provided with lock nuts 43 for holding them in adjusted positions. The axes of the cone-pointed screws 39 are perpendicular to the axes of the cone-pointed screws 42. Hence, the rack 34 is pivotable about two axes that are perpendicular to each other.

The weight and rate charts 6 and 7 and the pinion 35 are mounted on a shaft 44 journaled in ball bearings 45 carried by a boss 46 on the pillar 27 and in ball bearings 47 atop a post 48 erected from the scale base, the left hand end of the shaft 44 as viewed in FIG. II extending from the bearings 47 in cantilever fashion.

The pinion 35 is pinned by a pin 49 (FIG. III) to the shaft 44. The weight chart 6 is located on the shaft 44 closely adjacent the pinion 35 and it includes a pair of spiders 50, which from the end look like the rate chart as shown in FIG. V hereinafter described, having hubs 51 pinned by pins 52 to the shaft 44 and carrying a thin indicia-bearing sheath or skin 53. The hubs 51 are attached to the spiders 50 by means of screws 54, washers 55 separating the heads of the screws 54 from the spiders. The spiders 50 and the skin 53 form a cylindrical chart which is like an ordinary cylindrical chart except for its small size. Ordinary cylindrical charts have value and weight indicia. In contrast, the chart 6 only bears weight indicia including a "zero" line 56.

The weighing scale is sealed in against the weight chart 6 in the usual way. The weight chart 6 is never removed from the scale. Accordingly, the weighing scale retains its seal. The scale is sealed in by placing various capacity weights on the platter 8 and making corresponding trial and error adjustments until the scale weighs correctly at zero, first quarter, one-half, third quarter, and full capacities. The zero capacity adjustment is made by turning the adjustment screw 31 as above described. The span capacity adjustment (zero to full) is made by shifting the lower end of the spring 14 to the right or the left as viewed in FIG. II as above described. The half capacity adjustment need not be made if the spring 14 is linear; if it is not, the half capacity adjustment is made by shifting the upper end of the spring 14 to the right or the left as viewed in FIG. II as above described. The quarters (first and third) capacity adjustment is made by shifting weights carried by one of the spiders 50 of the weight chart 6. These weights are not shown, but identical weights are shown in FIG. V and will be described structurally and functionally hereinafter in connection with the rate chart 7. The above sealing adjustments are conventional. Every weighing scale must be sealed in in one way or another. However, it is important in connection with the weighing scale 1 that the weight chart 6 provides a means against which the scale is sealed in which means is never removed from the scale. Accordingly, the rate chart 7 can be replaced by another in the event of postal rate changes without destroying the seal of the scale.

The rate chart 7 includes a pair of spiders 57 having hubs 58 pinned by pins 59 to an axle 60 in the form of a tube and carrying a thin indicia-bearing sheath or skin 61. The hubs 58 are attached to the spiders 57 by means of screws 62 which extend through the spiders and through washers 63. The spiders 57 and the skin 61 form a cylindrical chart which is like the weight chart 6 except that it is larger. As described in connection with FIG. I, the rate chart 7 is provided with eight columns each divided into squares 12 and each of the squares 12 contains a black and a red postage figure (not shown) and also is provided with a "zero" line 64. A collet 65, having an extension 66 (FIG. VI) extending through the washer 63 and the spider 57 and into the hub 58 and abutting against an end of the axle 60, is attached to the spider 57 by means of the above screws 62. The free end of the collet 65 is tapered and provided with two slots 67 at right angles to each other and is partially threaded for the reception of a nut 68. An opening 69 extends through the collet 65 axially aligned with the axis of the tube axle 60 and receives the free end of the shaft 44 as shown in FIG. II, the shaft 44 extending partially into the tube axle 60. The nut 68 has an interior portion shaped to engage the tapered end of the collet 65 as shown in FIG. VI and is turned on the threaded portion of the collet until the tapered and slotted collet end is compressed and firmly grasps the shaft 44. This mounts the weight and the rate charts 6 and 7 in axial alignment on the shaft 44 for movement together as one.

The rate chart 7 is balanced at the factory and supplied to the field for replacement at random in the two-chart scales. Balance, i.e., balance of the chart relative to its axis of rotation, is accomplished by means of four weights 70 which are slidable at slots in the right hand spider 57 as viewed in FIG. IV. The slots are not shown, but identical slots 71 are shown in the spider 57 shown in FIG. V. The weights 70 also function as nuts which receive screws 72 that extend through and are slidable in the slots and which hold the weights 70 in their adjusted positions, i.e., the positions found by trial and error in which the rate chart 7 is balanced. Cylindrical charts normally have such slots 71 and weights 70 for making the quarters capacity sealing adjustment. The quarters capacity sealing adjustment is made in the weighing scale 1 as hereinbefore described by shifting weights at slots in one of the spiders 50 of the weight chart 6 which weights and slots are not shown but which are identical to the weight 70 and slots 71, respectively.

The weight chart sealing adjustment is peculiar to each scale, the weight chart 6 never being removed from the scale so that the scale stays sealed in. The rate chart balance adjustment is peculiar to each rate chart, each chart being individually balanced. One feature of the weighing scale 1 resides in so mounting the rate chart 6 in the scale that it can be readily replaced by another in the event of postal rate changes without destroying the seal of the scale. To replace the rate chart 7 with another, the collet nut 68 is loosened allowing the slotted and tapered end of the collet 65 to expand permitting the rate chart 7 to be withdrawn from the free end of the shaft 44. Another rate chart 7, which is supplied balanced, is provided with the collet nut 68 loosely threaded on the collet 65 and is slid onto the free end of the shaft 44 and the collet nut 68 is tightened securely after the rate chart is properly positioned in the scale. Proper positioning merely involves sliding the rate chart 7 sideways on the shaft 44 until the columns of indicia on the chart coincide with the proper zone indicia 11 underneath the window opening 4 and rotating the rate chart 7 on the shaft 44 until the rate chart zero line 64 coincides with the reading line 10—the weight chart zero line 56 must also coincide with the reading line 9, i.e., the zero lines on the two charts must be aligned. Hence, the substituted rate chart is readily mounted and positioned in the scale. After substituting one balanced rate chart 7 for another, the scale weighs correctly, at least after a minor zero correction made by turning the adjustment screw 31.

The weight and rate charts 6 and 7 must be mounted in axial alignment on the shaft 44. However, it is possible that through some manufacturing error the charts are not square after both are mounted on the shaft 44. A modified mounting means for the postal rate chart 7 is shown in FIGS. VIII and IX which is so adjustable that the rate chart 7 can be made square with the weight chart 6. Reference numbers in FIGS. VIII and XI which are similar to numbers in FIGS. I–VII refer to parts alike in structure and in function.

A hub 58a is pinned to an axle 60a by means of a pin 59a and is attached to a spider 57a by means of screws 73, a washer 63a separating the heads of the screws 73 from the spider 57a. A collet 65a is attached to the spider 57a and hub 58a by means of three screws 74 which extend through the collet 65a, washer 63a, spider 57a and are received in threaded holes in the hub 58a. Three screws 75 extend through threaded holes in the collet 65a, extend through holes in the washer 63a and spider 57a, and bear against the hub 58a. The screws 74 and 75 form pull and push connections, respectively. After the collet 65a is connected to the shaft 44 (FIG. II) by tightening a collet nut 68a, the rate chart is made square with the weight chart by trial and error adjustment of the pull and push screws 74 and 75 the adjustment of which shifts the axis of the rate chart relative to the axis of the shaft 44.

It is not intended that this invention be restricted to cylinder weighing scales. The generic idea of having two charts in contrast to the usual single chart, i.e., a weight chart which remains in the scale and against which the scale is sealed and a readily replaceable rate chart which can be replaced by a postal employee unskilled in scale mechanics because its replacement does not destroy the seal of the scale, may be embodied in a fan scale wherein such weight and rate charts are stationarily mounted and the indicia thereon are pointed out by a movable load-responsive indicator hand. It is to be understood that the above description is illustrative of this invention and that various modifications thereof can be utilized without departing from its spirit and scope.

Having described the invention, I claim:

1. A weighing scale comprising, in combination, load measuring means, indicating means having a portion operatively connected to the load measuring means, the indicating means including a first part for indicating load measured by the load measuring means and a second part, separable from the first part and readily replaceable in the scale, for indicating values computed in accordance with load measured by the load measuring means and predetermined factors, and means for so adjusting the scale relative to said first part that the scale weighs correctly.

2. A weighing scale comprising, in combination, load measuring means, load and postal rate indicating means having a portion operatively connected to the load measuring means, the load and postal rate indicating means including a first part for indicating load measured by the load measuring means and a second part, separable from the first part and readily replaceable in the scale, for indicating postal charges for such load in various zones, and means for so adjusting the scale relative to said first part that the scale weighs correctly.

3. A cylinder weighing scale comprising, in combination, load measuring means, rotatably mounted weight and postal rate cylindrical charts, means for so operatively connecting the charts to the load measuring means that the charts are rotated through equal increments of angle for equal increments of load upon the scale, the weight chart indicating load measured by the load measuring means and the rate chart, which is separable from the weight chart and readily replaceable in the scale, indicating postal charges for such load in various zones, and means for so adjusting the scale relative to the weight chart that the scale weighs correctly.

4. A cylinder weighing scale comprising, in combination, load measuring means, a rotatably mounted shaft having a cantilever end, means for so operatively connecting the shaft to the load measuring means that the shaft is rotated through equal increments of angle for equal increments of load upon the scale, a cylindrical weight chart mounted on the shaft to remain in the scale for indicating load measured by the load measuring means, and a cylindrical postal rate chart mounted on the cantilever shaft end for quick removal from the scale to indicate postal charges for such load in various zones.

5. A cylinder weighing scale comprising, in combination, load measuring means, a rotatably mounted shaft having a cantilever end, means for so operatively connecting the shaft to the load measuring means that the shaft is rotated through equal increments of angle for equal increments of load upon the scale, a cylindrical weight chart mounted on the shaft to remain in the scale for indicating load measured by the load measuring means, a cylindrical postal rate chart, and means including a collet attached to the postal rate chart for mounting the postal rate chart on the cantilever shaft end to indicate postal charges for such load in various zones.

6. A cylinder weighing scale comprising, in combination, load measuring means, a rotatably mounted shaft having a cantilever end, means for so operatively connecting the shaft to the load measuring means that the shaft is rotated through equal increments of angle for equal increments of load upon the scale, a cylindrical chart, and means for mounting the chart on the cantilever shaft end.

References Cited in the file of this patent

UNITED STATES PATENTS

| | | |
|---|---|---|
| 2,283,425 | Conners | May 19, 1942 |
| 2,334,326 | Hem | Nov. 16, 1943 |